(No Model.) 8 Sheets—Sheet 2.

W. WILLIS & J. & W. H. SMITH.
ROTARY METER.

No. 411,700. Patented Sept. 24, 1889.

(No Model.) 8 Sheets—Sheet 3.

W. WILLIS & J. & W. H. SMITH.
ROTARY METER.

No. 411,700. Patented Sept. 24, 1889.

Witnesses.
J. A. Rutherford
Robert Everett

Inventors
William Willis
John Smith
William H. Smith
By James L. Norris
Atty.

(No Model.) 8 Sheets—Sheet 4.

W. WILLIS & J. & W. H. SMITH.
ROTARY METER.

No. 411,700. Patented Sept. 24, 1889.

(No Model.) 8 Sheets—Sheet 6.

W. WILLIS & J. & W. H. SMITH.

ROTARY METER.

No. 411,700. Patented Sept. 24, 1889.

Witnesses
J. A. Rutherford
Robert Everett

Inventors
William Willis
John Smith
William H. Smith
By James L. Norris
Atty.

(No Model.) 8 Sheets—Sheet 7.

W. WILLIS & J. & W. H. SMITH.
ROTARY METER.

No. 411,700. Patented Sept. 24, 1889.

UNITED STATES PATENT OFFICE.

WILLIAM WILLIS, OF BROMLEY, AND JOHN SMITH AND WILLIAM HENRY SMITH, OF PENGE, ENGLAND.

ROTARY METER.

SPECIFICATION forming part of Letters Patent No. 411,700, dated September 24, 1889.

Application filed December 19, 1888. Serial No. 294,062. (No model.) Patented in England June 16, 1888, No. 8,858.

*To all whom it may concern:*

Be it known that we, WILLIAM WILLIS, manufacturer, a subject of the Queen of Great Britain, and a resident of Bromley, England, and JOHN SMITH and WILLIAM HENRY SMITH, engineers, subjects of the Queen of Great Britain, and both residents of Penge, England, have invented new and useful Improvements in and Relating to Rotary Apparatus for Measuring Liquids and for other Purposes, (for which we have obtained a patent in Great Britain, No. 8,858, bearing date June 16, 1888,) of which the following is a specification, reference being had to the accompanying drawings.

The main object of our invention is to provide simple and efficient means for measuring water and other liquids. Our improved apparatus is, however, applicable for other purposes.

Liquid-meters as hitherto constructed to be worked by means of vanes rotating around a common axis, and so arranged that the liquid will impinge upon them on one side of the said axis, are liable to give indirect indications. By our invention we obviate this defect and provide a liquid-meter wherein the number of revolutions of the vanes will be accurately proportionate to the quantity of liquid passed through the meter. To accomplish this result, we arrange the vanes to revolve in a suitable chamber or casing around a common axis, and we provide means whereby the said vanes in their rotation will be automatically adjusted upon or about other axes intersecting the said common axis, so that each vane as it moves away from the inlet or admission aperture will present a much larger surface to the action of the fluid than when it is approaching the said inlet or aperture. For instance, assuming that the said common axis is vertical, each vane will be vertical while moving from the inlet toward the outlet or in the direction in which the fluid passes through the apparatus, and horizontal while moving from the outlet toward the inlet or in opposition to the fluid. We usually arrange the vanes in pairs—that is to say, we provide transverse spindles, each of which has fixed thereon two vanes at right angles to each other, and we so construct the apparatus that while one vane moves through a contracted part of the chamber or casing with its side or larger surface subjected to the pressure of the fluid the opposite vane will move through a still more contracted part of the said chamber or casing with its edge presented to the fluid. The series of vanes will therefore be rotated upon or about the common axis by the pressure of the fluid.

Our said invention, moreover, comprises other improvements hereinafter set forth.

In the accompanying drawings.

Like letters indicate corresponding parts throughout the drawings.

A is the chamber or casing, which is closed by the cover A'.

B is the inlet; C, the outlet.

Figure 1:
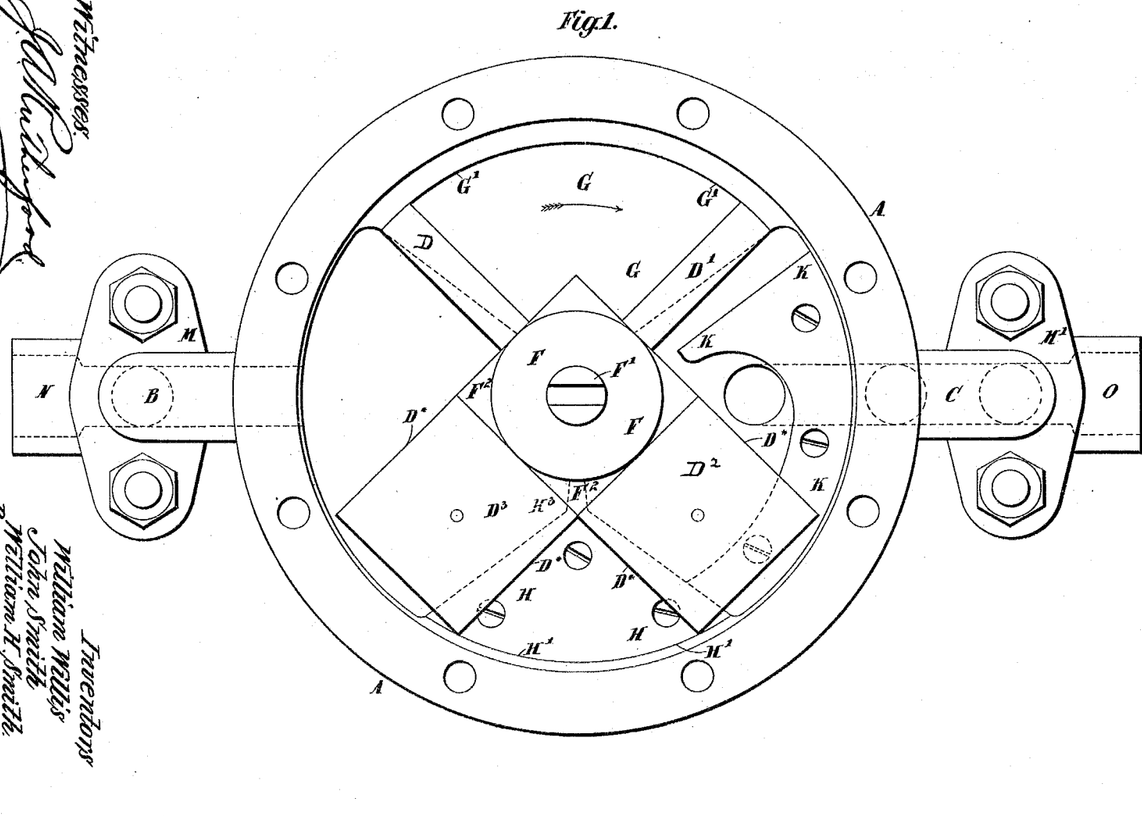
Figure 1 is a plan of one form of our improved apparatus, the cover of the chamber or casing being removed.
Figure 2:
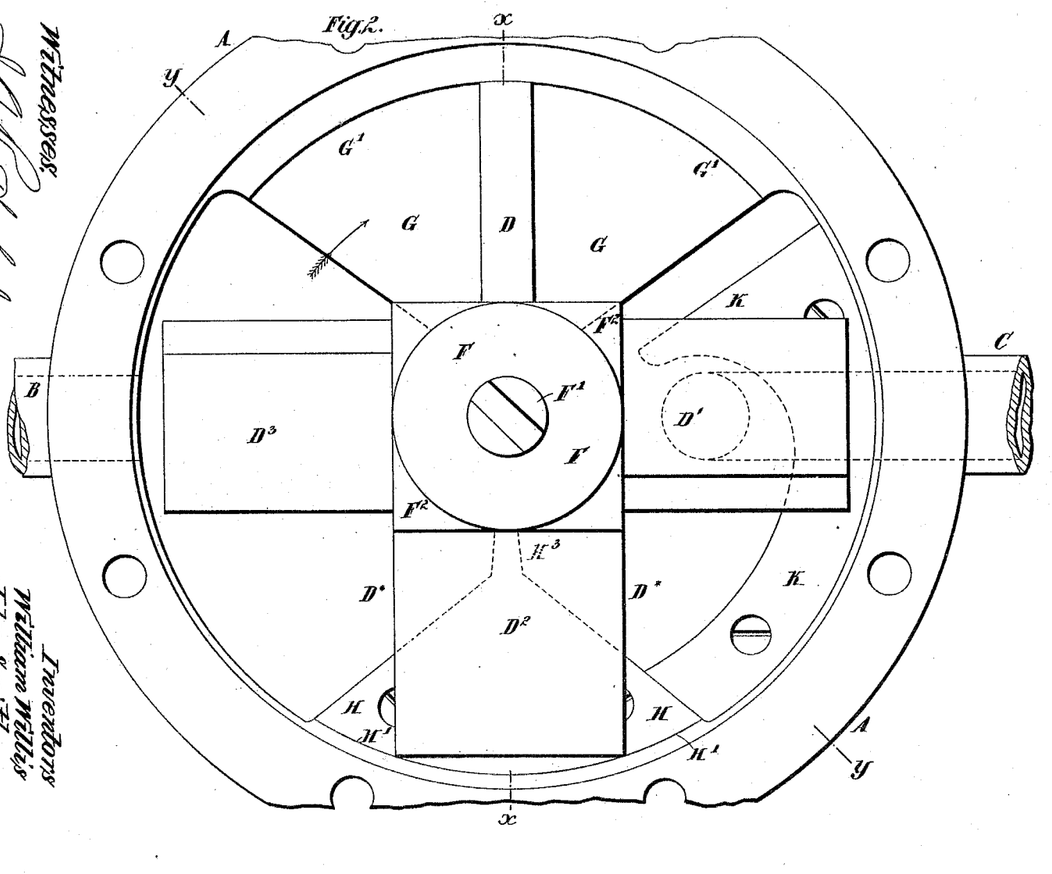
Fig. 2 is a similar view showing one pair of vanes in the course of adjustment for the purpose hereinafter specified, some of the parts being removed. This and the following figures are drawn to an enlarged scale.
Figure 3:
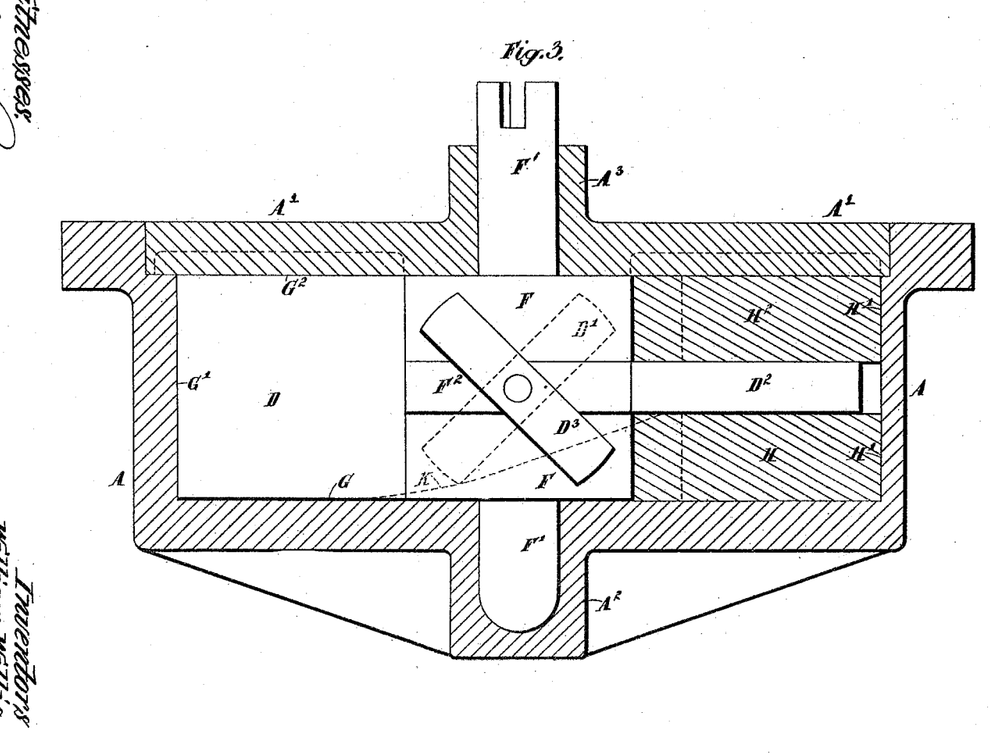
Fig. 3 is a section on the line $xx$, Fig. 2, with the cover in place on the chamber or casing, the vanes being shown in side elevation.
Figure 4:
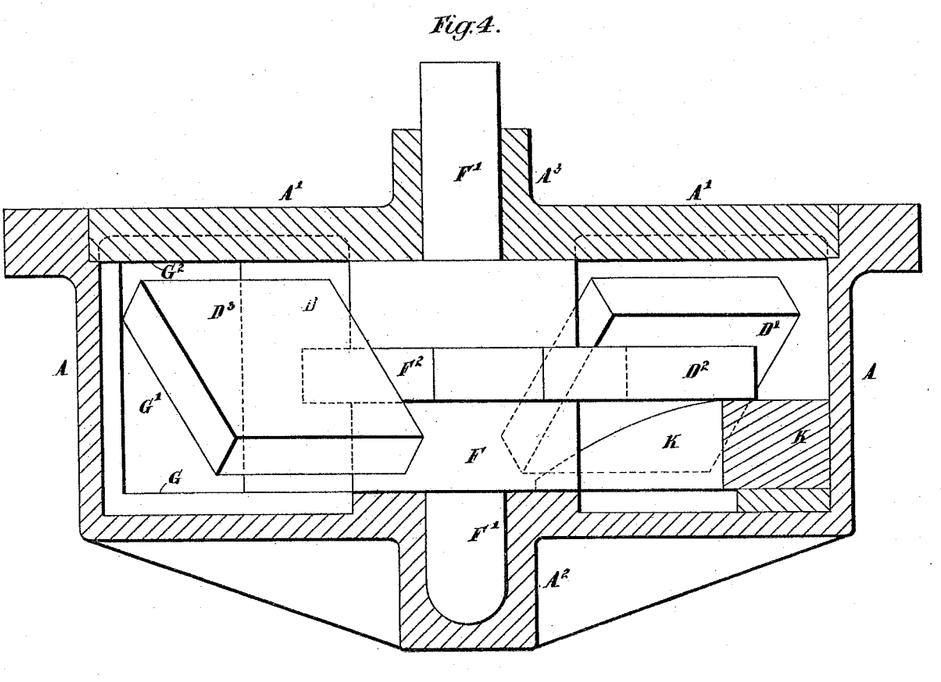
Fig. 4 is a section on the line $yy$, Fig. 2, the vanes being shown in side elevation.
Figure 5:
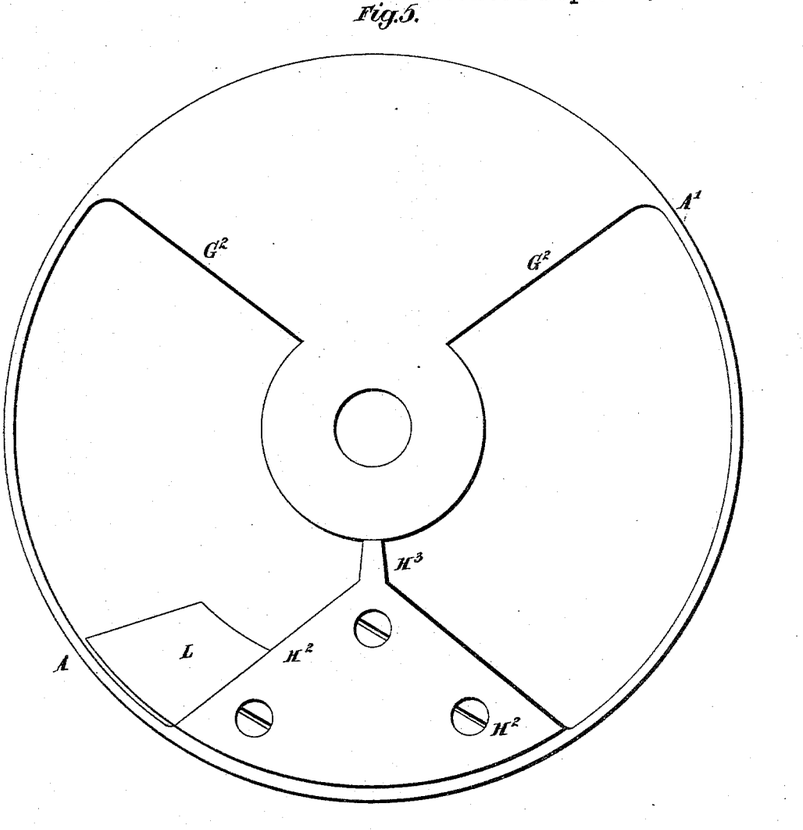
Fig. 5 is an under side view, and Fig. 6 a side elevation, of the said cover.
Figure 6:
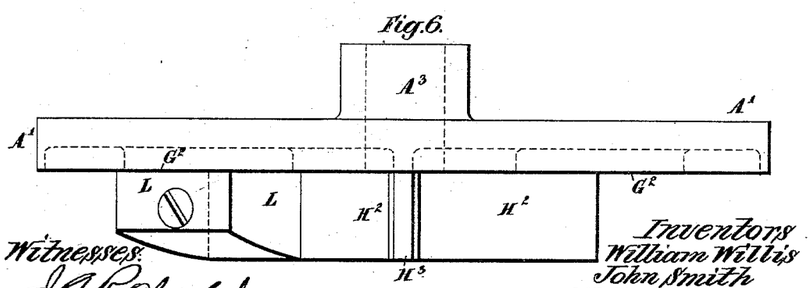
Figure 7:
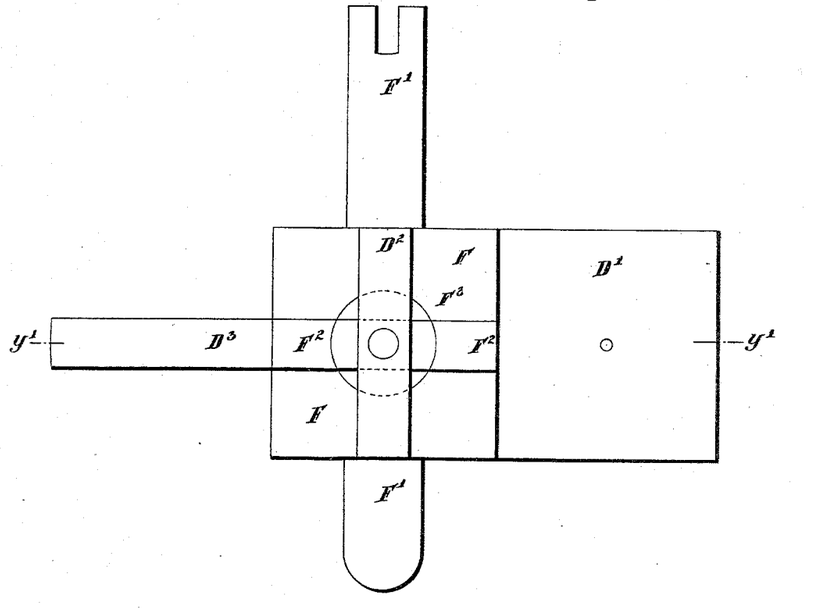
Fig. 7 is a side elevation, and Fig. 8 a plan, partly in horizontal section, on the line $y'y'$, Fig. 7, showing the vanes and a central piece or hub to which they are attached.
Figure 8:
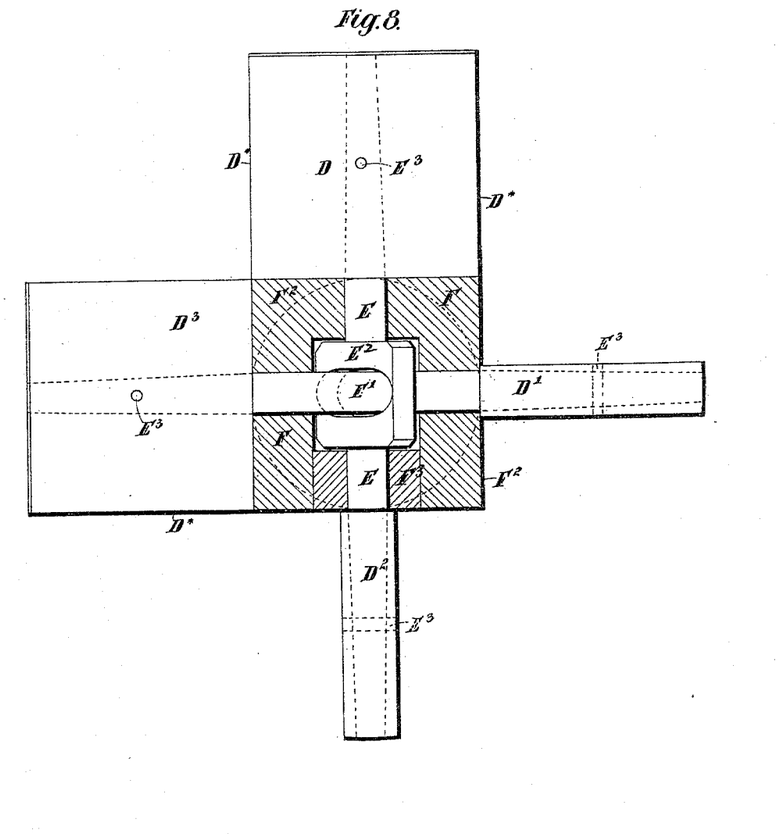

D D' $D^2$ $D^3$ are vanes formed of vulcanite or other suitable material. The vanes D $D^2$ are fixed on a spindle E and the vanes D' $D^3$ on a spindle E', so that the vanes of each pair are rigidly connected at right angles to each other. The spindles E E' are fitted to turn in a central piece or hub F, formed with a spindle F', whereby the said hub and the vanes are supported in bearings $A^2 A^3$ in the casing A and cover A'. The spindle E is formed with a slotted enlargement E², through which the spindle E' is passed, and the said spindles are so arranged that their axes are in the same plane and intersect the axis of rotation of the set or series of vanes. The hub F is made of cylindrical form, with a square portion or collar F², for the purpose hereinafter specified. The hub and its spindle are formed in one piece of vulcanite or other suitable material, and the said hub is bored out to receive the enlargement E² of the spindle E, and is provided with a bush or plug F³, which fits upon the said spindle, and is securely fixed in the said hub. The spindles E E' are tapered at each end, and the vanes are fitted thereon and secured by means of pins E³, as shown in Fig. 8. We prefer that the hub and vanes should be made of vulcanite or ebonite or other material of the same or approximately the same specific gravity as the liquid, so as to diminish the resistance to rotation of the said hub and vanes due to friction. It is, moreover, advantageous to provide a stuffing-box of vulcanite or ebonite or other suitable material around the upper part of the spindle F'. Any suitable number of vanes may be used. We prefer, however, for the sake of simplicity of construction, to employ four vanes, as shown, each pair being arranged to turn with its spindle through an angle of ninety degrees upon or about the axis of the said spindle, as hereinafter described. The inlet B and outlet C are situated on opposite sides of the casing A. Between the said inlet and outlet the chamber or casing is slightly contracted on one side of the hub F by means of projecting surfaces G G' on the said chamber or casing and a projection G² on the cover A'. The surfaces G G² are made truly parallel, and the surface G' is made accurately concentric with the axis of rotation of the vanes, so that each vane when passing through this contracted portion of the chamber with its larger surface or side subjected to the action of the fluid will accurately fit the said contracted portion. The said chamber or casing is in a similar manner still farther contracted on the opposite side of the hub F by means of projecting pieces H H² on the casing A and cover A', and a projecting surface H' on the said casing, so that the vanes can only pass edgewise through this contracted part. The cylindrical surface H' is made of larger radius than that of the cylindrical surface G', so that as each vane passes edgewise through the contracted part or slot H H' H² its corners will touch or nearly touch the said surface H', as shown in Fig. 2—that is to say, the vane will fit the slot with sufficient accuracy to prevent leakage of the fluid between the same and the surfaces H H' H². It will be seen that the sides and the edges D* of the vanes D D' D² D³ are parallel to each other and to the axis of the spindle, and the surfaces G G² and H H² are also parallel to each other. This formation greatly simplifies the manufacture of the meter, as the said surfaces can be easily formed and finished by turning in a lathe or otherwise, and the vanes can without difficulty be made to fit in accurately between the said surfaces. The square part or collar F² of the hub F has bearing-surfaces for the vanes equal in width to the said vanes, and fills up the space which, if the said hub were circular in transverse section throughout its length, would be left void between the said hub and adjacent vanes when the latter are in the position occupied by the vanes D² D³ in Fig. 1, leakage between the narrow parts H³ of the surfaces H H² when the vanes are in the position shown in Fig. 1 is thus prevented.

Although we prefer when the hub F is made with a square collar, as shown, that the vanes should be square or rectangular, it is obvious that their outer edges may be curved or of other suitable form.

In the bottom of the chamber or casing A, and near the outlet C, we provide a projection or striking-piece K, which has an inclined or helical surface, and which is so arranged that each vane as it rotates with the hub F will immediately after it has emerged from the contracted part G G' G² of the casing strike against the said inclined or helical surface, and be thereby turned through an angle of ninety degrees to enable it to enter the contracted part or slot H H' H².

To obviate liability to injury of the vanes or their spindles by concussion or torsion when the vanes are rotated at a high speed upon or about the common vertical axis, it is important that the said vanes should be turned upon or about their horizontal axes as slowly as practicable relatively to the speed of their rotation about the common axis. For this purpose the chamber or casing is so constructed that there is ample space between the contracted portions thereof to permit the turning of the said vanes slowly, and the surface of the striking-piece K is so formed that its action upon the vanes will be very gradual. To further diminish the liability to concussion, the projection or striking-piece K is so arranged that it will act first upon the lower edge of the vane—that is to say, upon the part thereof farthest from the horizontal axis—and the part of the said striking-piece K which first acts upon the vane is made as wide as practicable. A projecting piece or guide L, having an inclined or curved surface, is, moreover, provided on the cover A' above the projection or striking-piece K and at the edge of the surface H², so that it will form an inclined or curved continuation of the said surface, and will facilitate the entrance of the vanes into the contracted part or slot H H' H².

The upper end of the spindle F' of the hub F is connected in any convenient manner with indicating or registering mechanism of well-known or other suitable construction.

The operation of our improved apparatus when used as a liquid-meter is as follows, viz:

Assuming the parts to be in the position shown in Fig. 1, the liquid under pressure, entering through the inlet B, will exert its pressure upon the vanes D D³, and the vane D being vertical while the vane D³ is horizontal, such pressure will cause the set or series of vanes to rotate in the direction indicated by the arrow in Figs. 1 and 2. After the vane D' emerges from the contracted part G G' G² of the casing, it comes in contact with the inclined piece or projection K, whereby this vane and the vane D³ are turned through an angle of ninety degrees, so that the vane D³ will enter the contracted part G G' G² of the casing, and will present its side to the action of the liquid, while the vane D' will enter the contracted part or slot H H' H², and will present its edge to the liquid while moving in opposition thereto. The vanes are thus in turn automatically adjusted, so that they will present to the action of the liquid a larger surface when moving therewith on one side of the common axis than when moving in opposition thereto on the other side of the said axis.

The apparatus is preferably provided with flanges M M', Fig. 1, whereby it is connected to the feed and delivery pipes N O. It will be seen that these flanges are so arranged that the joints, instead of being in planes parallel to the common axis of rotation of the vanes, are in planes extending through the casing and intersecting the said axis, so that when the meter is fixed horizontally the surfaces of the flanges M M' will be horizontal and facing downward, and the meter can be dropped into its place and lifted therefrom without disturbing the said feed and delivery pipes. By this means we greatly facilitate the making of the joints between the said flanges and those of the said pipes. Moreover, the meter can be very readily removed from the place for repairs or otherwise and replaced.

Figure 9:
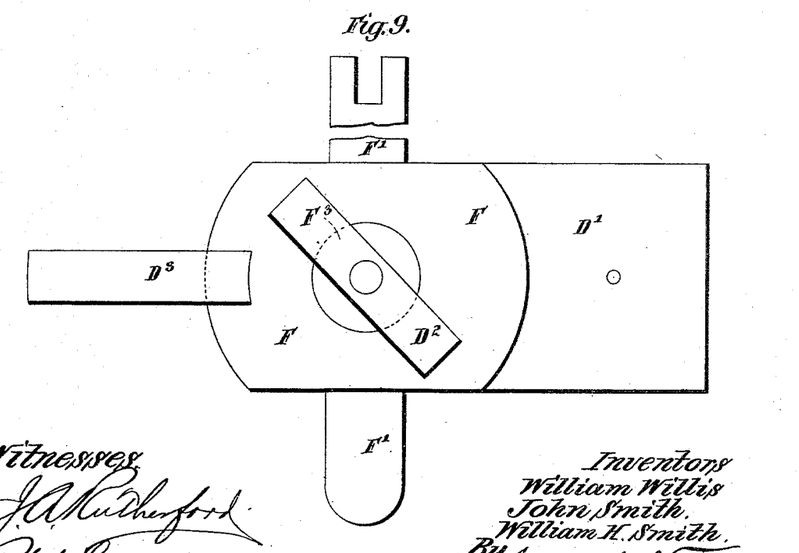
Fig. 9 is a side elevation illustrating a modified construction of the said vanes and hub.
Figure 10:
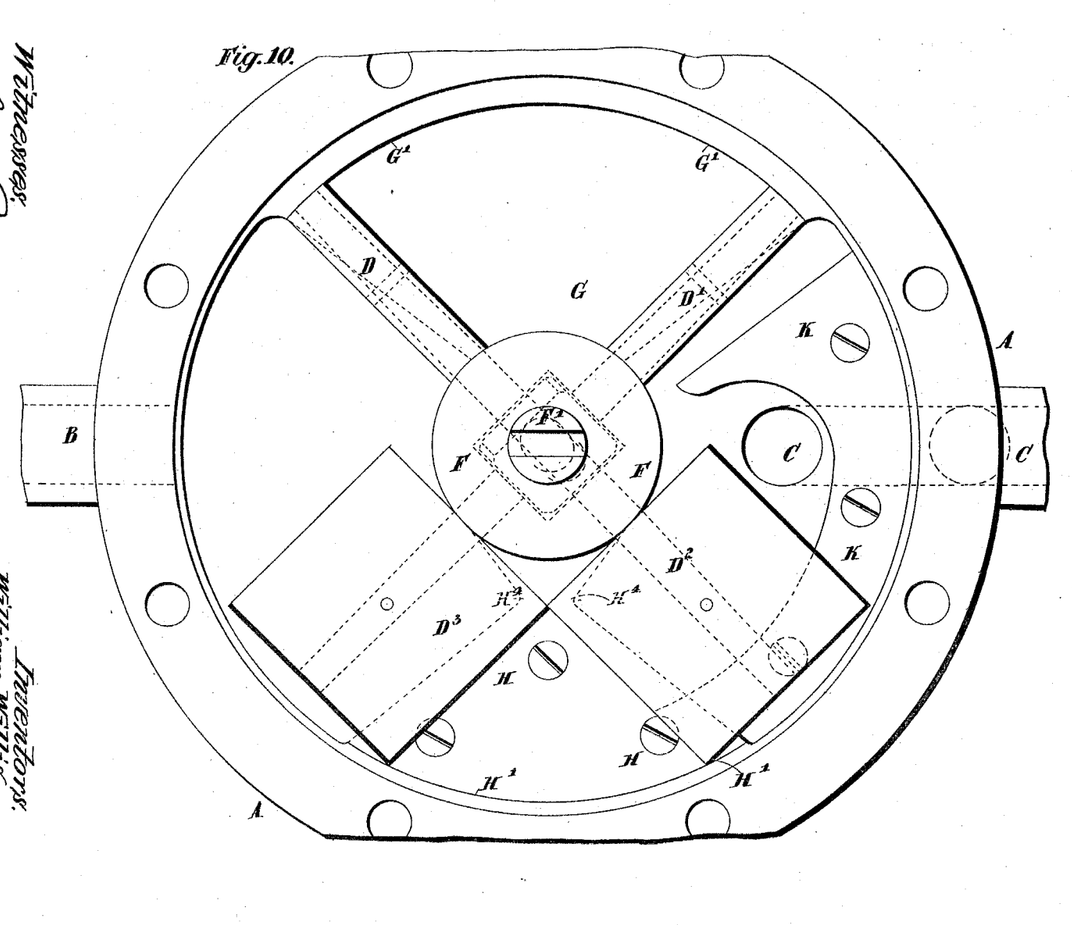
Fig. 10 is a plan illustrating another modification of our invention hereinafter described.

Instead of providing the hub F with a square collar, as above described, we in some instances make the said hub spherical or in the form of a truncated sphere, as shown in Fig. 9, and we make the edges of the vanes next the said hub of corresponding form, so that the said vanes will closely fit the spherical surface of the hub in any position into which they may be turned upon or about their horizontal axes, and will thus prevent leakage without other provision being made for this purpose. In other instances we use a hub which is cylindrical throughout its length, and we make the parts H³ of the surfaces H H² of the peculiar form shown at H⁴ H⁴ in Fig. 10, so that when the vanes are in the position shown in this figure no leakage can take place between the cylindrical hub and the adjacent edges of the vanes. Moreover, ample space will be left for the turning of the vanes upon or about their horizontal axes after they emerge from the contracted part or slot H H' H²—that is to say, the peculiar formation of the surfaces H H² will not interfere with or obstruct the turning of the vanes, as hereinbefore described.

In case where a large flow of liquid has to be measured we prefer, instead of enlarging the vanes, to employ two or more sets or series of vanes arranged one above another to rotate upon or about the same vertical axis in a chamber or casing formed with a corresponding number of contracted parts or slots, through which the vanes can only pass edgewise, and with separate devices for automatically effecting the adjustment of the vanes of each set or series. The said vanes may be so arranged that the upper edges of those of one set will touch the lower edges of those of the set next above it when the vanes are vertical.

By our improvements herein described we are enabled to construct a liquid-meter which will work with very low pressures or with a very small head or flow of liquid, the resistance to the rotation of the vanes due to friction or other causes being very slight.

It is evident that we can, if desired, somewhat further modify the construction of our apparatus without departing from the nature of our invention. In some instances we make the chamber or casing with only one contracted part, and we round the edges of the vanes, so that they can turn freely in the other part of the said chamber.

It is obvious, moreover, that our improved apparatus, although chiefly designed to serve as a liquid-meter, can be used for other purposes—for example, as a motor, pump, or fan-blower, the spindle of the hub being connected with the mechanism to be driven or with any suitable driving mechanism, as the case may be.

What we claim is—

1. In a rotary apparatus for the purpose above specified, the combination of a cylindrical chamber or casing having wide and narrow segments with parallel sides and of different radii, a central rotary hub, spindles carried thereby, so that their axes intersect each other, vanes fixed in pairs upon the said spindles at right angles to each other and having their sides parallel to the axis of the corresponding spindle and their outer ends straight and at right angles to their sides, and an incline or striking-piece for turning the said vanes about their axes in their rotation about the axis of the hub, for the purposes above specified.

2. In a rotary apparatus for the purposes specified, the combination of the cylindrical chamber or casing A, having the wide and narrow segments G G' G² and H H' H², with parallel sides and of different radii, the rotary hub F, the spindles E E', carried thereby, so that their axes intersect each other, the vanes D D' D² D³, having parallel sides and straight ends at right angles thereto and fixed in pairs upon the said spindles, the incline or striking-piece K, for turning or adjusting the vanes in their rotation about the axis of the said hub, and the guide L, for facilitating the entrance of the vanes into the narrow segments, substantially as and for the purposes set forth.

3. In a rotary apparatus for the purposes described, the combination, with the cylindrical chamber or casing, of square or rectangular vanes fixed in pairs upon spindles E E', the axis of which intersect each other, a rotary hub F, through which the said spindles are passed, and which is provided with a square part or collar $F^2$, having bearing-surfaces equal in width to the said vanes, and an incline or striking-piece K, for turning or adjusting the vanes in their rotation about the axis of the said hub, substantially as and for the purposes set forth.

4. In a rotary apparatus for the purposes specified, the combination, with the cylindrical chamber or casing, of the hollow hub F, the vanes D D' $D^2$ $D^3$, the spindles E E', having taper parts to receive the said vanes and extending through the said hub, with their axes intersecting each other, and the bush or plug surrounding one of the said spindles and closing the cavity in the said hub, substantially as and for the purposes set forth.

5. In a rotary apparatus for the purpose specified, the combination of the cylindrical chamber or casing, the laterally-projecting inlet and outlet pipes B C, having flanges M M' in a plane at right angles to and intersecting the axis of the said chamber or casing, the hollow hub F, the vanes D D' $D^2$ $D^3$, the spindles E E', having taper parts to receive the said vanes and extending through the said hub, with their axes intersecting each other, and the bush or plug surrounding one of the said spindles and closing the cavity in the said hub, substantially as and for the purposes set forth.

6. In a rotary apparatus for the purposes specified, the combination, with the square or rectangular vanes and the hub having the square part or collar, of the cylindrical chamber or casing provided with the wide and narrow segments, and the entrance and exit edges $H^4$ of the narrow segment converging for a short distance from the cylindrical part of the said hub and then diverging, substantially as and for the purpose set forth.

In testimony whereof we have hereunto signed our names in the presence of two subscribing witnesses.

WILLIAM WILLIS.
JOHN SMITH.
WILLIAM HENRY SMITH.

Witnesses:
DAVID YOUNG,
ARTHUR TRACY.